Figure 1:
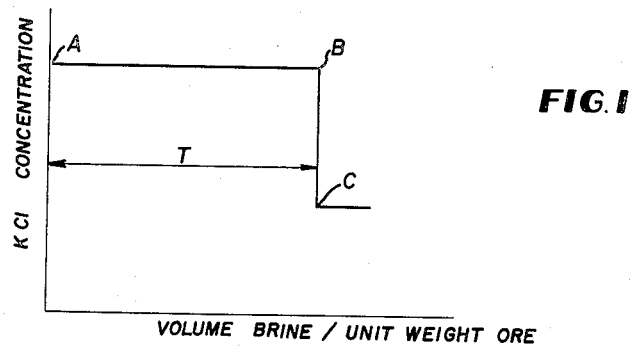

April 14, 1964   J. A. HERMANN   3,129,067
PROCESS FOR EXTRACTING SOLVENT SOLUBLE SUBSTANCES
Filed Sept. 23, 1960

INVENTOR.
JOHN A. HERMANN
BY Shanley & O'Neil
ATTORNEYS

United States Patent Office 3,129,067
Patented Apr. 14, 1964

3,129,067
PROCESS FOR EXTRACTING SOLVENT
SOLUBLE SUBSTANCES
John A. Hermann, Golden, Colo., assignor to Farm Chemical Resources Development Corporation, a corporation of Delaware
Filed Sept. 23, 1960, Ser. No. 58,072
12 Claims. (Cl. 23—311)

This invention relates to the leaching of ores and more particularly to improvements in the percolation leaching of ores containing solvent-soluble constituents.

A wide variety of ores containing solvent-soluble constituents are amenable to processing by what is termed "percolation leaching" wherein the crude or partially refined ore with its desired mineral and gangue material content is charged to a vat or tank having a false bottom and the resulting body of ore leached in place. As examples of ores that may be processed by percolation leaching, there may be mentioned ores of soluble potassium salts such as potassium chloride, ores of soluble nitrate salts such as sodium nitrate (caliche), or ores of borax, etc. Broadly speaking, in practicing such percolation leaching processes a solvent liquid at a chosen temperature is fed to the vat to dissolve selectively the desired mineral constituent and the bed of ore with its gangue serves as a filtering medium for the liquor which is passing therethrough. Thus, it is often possible to avoid costly and difficult filtration steps in the processing of the ore.

While numerous ores are suitable for use in practicing the present invention including the ores mentioned above, in the interest of clarity the present invention will be described and illustrated hereinafter with specific reference to the processing of potash ores of the type found in the Carlsbad region of New Mexico. However, it will be understood by those skilled in the art that a wide variety of other ores that are known to be amenable to percolation leaching may be used.

It has long been desired to achieve practical percolation leaching of Carlsbad potash ores since these deposits, particularly those of lower grade with respect to potassium chloride content, are in general heavily contaminated with troublesome clays and other insoluble constituents such as hematite. Upon contacting the ore with leach brines or solutions, the insolubles will in ordinary agitation leaching slake, peptize and disperse as fine slimes which interfere markedly with subsequent clarification operations such as thickening or filtering. Accordingly, effective practical percolation leaching of Carlsbad type potash ore with elimination or significant alleviation of the clarification difficulties would be highly desirable. Numerous attempts have been made to devise practical schemes for the percolation leaching of such ores, but they have not been entirely successful in the commercial production of potash.

It is an object of the present invention to provide an improved percolation leach process for ores containing a desired solvent-soluble constituent.

It is a further object of the present invention to provide a percolation leach process which may be effectively practiced on coarsely crushed ore at very high rates of extraction and saturated brine production.

It is still a further object of the present invention to provide a percolation leach process which may be effectively practiced on coarsely crushed Carlsbad-type potash ores.

It is still a further object of the present invention to provide a process wherein brine substantially saturated with respect to potassium chloride is continuously produced from Carlsbad-type potash ore at high flow rates and at elevated temperatures without the need for storing brine partially saturated with potassium chloride or recirculating partially saturated brine through the ore.

Figure 2:
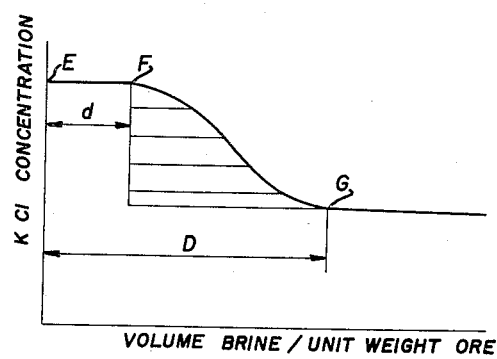
Figure 3:
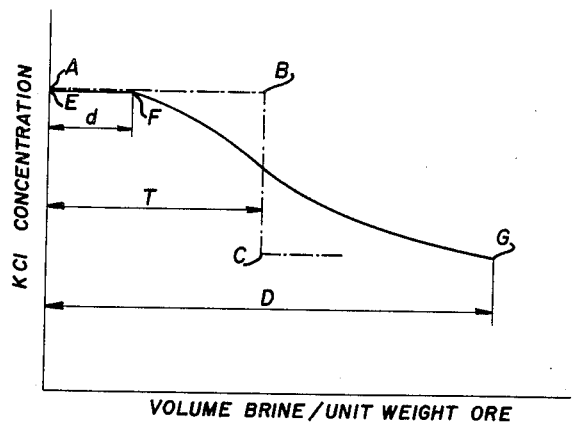

Still other objects and advantages of the present invention will be apparent to those skilled in the art upon reference to the following detailed description, the specific examples, and the drawings, wherein:

FIGURE 1 graphically illustrates the manner in which the potassium chloride concentration in the product brine varies with the volume of brine per unit weight of ore in an ideal percolation leach process;

FIGURE 2 graphically illustrates the manner in which the potassium chloride concentration in the product brine varies with the volume of brine per unit weight of ore in a peroclation leach process as actually encountered in practice; and FIGURE 3 graphically illustrates the manner in which the potassium chloride concentration in the product brine varies with the volume of brine per unit weight of ore, with the graphs of FIGURES 1 and 2 being superimposed for the purpose of more clearly illustrating certain features.

In practicing the present invention, preferably the brine or solvent liquid is passed through a body of coarsely crushed potash ore and gangue in place in a vat or series of vats for as long as brine issuing from the last vat is substantially saturated with respect to potassium chloride. When the brine issuing from the end vat begins to deviate from saturation and thus is no longer saturated, a vat containing fresh ore is placed on stream at the end of the series. This process is continued until the ore in the first vat in the series has been depleted to a desired level in potassium chloride content, at which time the solvent brine is then displaced from the depleted ore, the depleted ore unloaded from the vat, and the vat reloaded with fresh ore to be placed eventually at the end of the series of vats.

In developing the above process, it has been discovered that several features of operation and control are important for obtaining satisfactory results, as follows:

(1) The solvent liquid such as mother liquor from a crystallizing operation should be hot so that potassium chloride can be recovered from a saturated solution by a cooling step;
(2) For best results, the ore should be pre-heated and preferably by steam; and
(3) The ore should be coarsely crushed to obtain high flow rates of brine through the ore.

The percolation leaching process may be effected in a variety of ways. For instance, a quantity of potash ore may be crushed to the desired size and charged to a heated or insulated column, heated in place to an elevated temperature such as about 90° C. or higher by steaming, and the charge leached in place by feeding thereto a sufficient quantity of low temperature (25° C.) equilibrium sodium chloride-potassium chloride brine heated to a higher temperature such as 90° C. or higher. The effluent brine is collected and analyzed at frequent intervals for its potassium chloride content. Under idealized conditions and at extremely long brine retention times, a plot of the potassium chloride concentration in the effluent brine as a function of volume of brine per unit weight of ore would tend to approach the plot shown in FIGURE 1. In this idealized system and with reference to FIGURE 1, the concentration level from point A to point B is that of brine saturated with potassium chloride and at equilibrium at a given temperature of operation such as 90° C. At point B, all of the potash has been leached from the ore and, assuming idealized perfect brine displacement by the influent liquor, the potassium chloride concentration would then abruptly drop to the plateau C which is the concentration of potassium chloride in the influent brine. Thus, the length T is the theoretical yield of saturated brine for a given weight of ore.

Under less than ideal conditions, such as are always encountered in commercial practice, the actual potassium chloride concentration plot deviates from the ideal and may take the form shown in FIGURE 2. When sufficient brine has been fed, the potassium chloride level will begin to approach the influent potassium chloride concentration asymptotically. A certain relatively small fraction of the brine charge may therefore issue from the leach column saturated, and the remainder will not be saturated with potassium chloride. With reference to FIGURE 2, in practice if the effluent brine of saturated concentration as shown between the points E and F is of sufficient clarity it may be processed in a suitable crystallizing device and cooled to yield a substantially pure potassium chloride product. On the other hand, cooling or crystallizing of brine products of concentrations represented by the curved line of FIGURE 2 (the hatched area) between points F and G will yield a potassium chloride product of lesser and lesser purity as the effluent brine drops in potassium chloride concentration to the influent concentration at point G. This later potassium chloride product is inferior and it would require further purification such as by recrystallization or flotation. Alternately, fractions of the unsaturated brine may be stored separately and used in subsequent leaches as described in the aforementioned U.S. patent. The length $d$ is the quantity of saturated brine obtained from a given weight of ore and the length D represents the total volume of brine required to leach the ore.

It is evident from the above that in the percolation leaching of a potash ore, the product brine being processed by crystallization should be substantially saturated at high temperature with potassium chloride. Additionally, economics demand that a high ratio of saturated brine to unsaturated brine be produced, in order to minimize storage of advancing brines or reprocessing of low grade potassium chloride produced from cooling of less than saturated brines.

Superposition of the plots of FIGURES 1 and 2 gives the curves depicted in FIGURE 3. With reference to FIGURE 3, the length T relates to the theoretical yield of saturated brine for a given charge of ore; $d$ relates to the quantity of saturated brine obtained under less than ideal conditions, and D represents the actual volume of brine needed to leach a charge of ore completely. In the ideal case, $d=D=T$. Accordingly, the ratio $d/T$ reflects the efficiency of the leaching operation in terms of saturated brine production with the ideal value being unity. On the other hand, $D/T$ is a ratio which reflects the inefficiency of the extraction in terms of the ratio of actual volume of brine required to the theoretical volume needed to effect substantially complete extraction. The greater this ratio, then the poorer the efficiency, as illustrated by the following mathematical formulae:

$$\frac{d}{T}=A$$

$$\frac{D}{T}=B$$

It follows that:

$$\frac{A}{B}=\frac{d}{T}\bigg/\frac{D}{T}=\frac{d}{T}\times\frac{T}{D}=\frac{d}{D}=Q$$

I define Q as the "saturation yield quotient," a value which is the ratio of saturated brine to total brine delivered per unit weight of ore. Since Q is inversely proportional to D as derived, and as 100% extraction is rarely economical in a practical leaching operation, D is defined as the quantity of brine per unit weight of ore which is necessary for at least an 80% extraction of the potassium content of the ore, as represented by point G in FIGURE 2. Thus, by choice, D may be increased by prolonging the percolation leaching, but it is a volume of brine per ton or other unit weight of ore which will afford at least an 80% by weight extraction of the contained potassium salts.

It is highly desirable from an economic standpoint to be able to process coarsely crushed ore and preferably ore crushed no finer than that delivered directly by a mechanical continuous miner in the mining operation. Such an ore contains a relatively large percentage of material in the size range from ½ inch to 4–5 inches. Since in practice such ore would be delivered to a leach vat in the form of an unclassified bed, it would be anticipated that brine effluent from the leaching of such a charge of ore would be poorly clarified, if at all. Furthermore, it would be predicted that leaching of coarse ore would be impractical from the standpoint of efficient brine utilization and that it would not lend itself to the production of a potassium chloride-saturated brine suitable for processing in a crystallizer. As discussed in a preceding section, examination of coarsely crushed ore led to no useful results for these reasons, and the conclusions receive additional support from the fact that prior art processes for the percolation leaching of potash ores were limited to the treatment of ore more finely crushed than that described above, and no processes were known heretofore for the utilization of coarse ore.

It has been discovered that Carlsbad-type potash ore, despite its high clay and insolubles content, may be economically percolation leached when crushed so as to contain at least 10% and preferably 20% or more of material in the size range of minus 3–4 inches but retained on 4 mesh (Tyler), that the effluent brine clarity is not significantly different from that obtained in the percolation leaching of finer ores, and it is possible to achieve high extraction efficiency and high yields of substantially saturated brine that may be produced at high flow rates which are subject only to minimal attenuation. The simplest way to achieve the foregoing is to carry out the leaching operation in a relatively deep vat or in a series of shallow vats wherein the brine or solvent liquor proceeds from one vat to a succeeding vat or vats in the series in such a manner as to provide a path of at least a critical length for ore-brine contact. Carrying out the percolation leaching operation in a vat or series of vats having a length or total length less than a certain critical value results in entirely unsatisfactory extraction or extremely low production of saturated brine for a given ratio of volume of brine to unit weight of ore. This critical value has been found to be intimately related to the size and relative proportion of the coarser fractions of the ore, and although it is possible to relate the total length of the leach column or columns to the size and proportion of the coarser fractions, it has been found that the over-all effect may be combined in the concept of the aforementioned "saturation yield quotient," i.e., Q. It has been further discovered that for any given ore size and size distribution, with a leach brine of constant composition and at relatively constant temperature and flow rate, Q is a function of the depth of ore through which the brine must percolate, and therefore by defining a minimum Q it is possible to define the critical relationship of height of ore to ore size which is necessary for operating in accordance with the invention.

The fact that the saturation yield quotient Q increases with increasing ore depth, all other variables being constant, is an entirely unexpected result as Q, by definition, is the ratio of saturated brine to total brine required to achieve extraction of at least 80% by weight of the soluble potash content of the ore. Thus, as the weight of ore increases directly and linearly with the depth, it would be expected that the volume of brine needed to leach at least 80% of the charge would increase linearly by a corresponding amount. However, it has been discovered that the brine requirement to achieve at least 80% by weight extraction does not increase in the same proportion as the weight of ore increases with depth and that Q actually increases with depth. As an example, doubling the length does not increase the brine requirement for 80% extraction (D) by a factor of two but somewhat less than two; moreover the yield of saturated brine (d) may be more than doubled, and therefore Q (or d/D) increases with depth, which is entirely unexpected. The critical relationship of total depth of ore to the coarse size distribution of the charge is defined as that depth of ore which, when leached in a batch operation with a relatively low temperature brine or solvent heated to some higher temperature, will afford a saturation yield quotient Q for the system of at least 0.2 at a degree of extraction of at least 80% by weight. Accordingly, it will be apparent that the concept of the saturation yield quotient Q defines the interrelationship of critical mean ore size, bed depth and flow rate. Through the use of this concept, it is possible, as will be illustrated in the examples hereinafter, to achieve practical efficient percolation leaching of Carlsbad-type potash ores containing at least 10% and preferably more of particles in the size range 4 mesh to about 3–4 inches through the expedient of treating a single charge or a plurality of charges in series providing a sufficient depth so that the saturation yield quotient Q for the system is at least 0.2 and preferably higher at an extraction of at least 80%.

Obviously, if a Q of 0.2 is reached for a given ore charge at a depth of, for example, 40 feet, then this depth may be achieved in a single 40-foot column or in any number of columns in series totalling at least 40 feet in depth. Increasing the length of the ore path beyond this, all other factors being equal, merely increases the effective Q for the system and thus the system is even more efficient. It follows that the upper limit on the maximum depth of the column or columns is practical in nature, with better results being obtained at greater depths.

The depth of coarse ore necessary to achieve a Q of 0.2 or higher may be used in designing a leach circuit such that the system may be operated on a truly batch countercurrent basis with the production of substantially saturated brine as the only effluent. For example, the reciprocal of the saturation yield quotient (1/Q) for a particular system will give the number of columns of substantially equal depth into which the over-all critical depth may be divided for achieving a continuous operation producing essentially only saturated brine. If the Q reciprocal is not an integral number, as for example 3.2, then it is preferred to use the next highest integral number (4) as the number of columns in the series, and in the succeeding discussions it will be understood that for non-integral 1/Q, the next highest integral number is to be chosen. By way of illustration, if a 40 foot depth of ore is required in order to result in a Q of 0.25 for an extraction exceeding 80%, then the Q reciprocal of 4.0 indicates that under steady state conditions if at least four 10-foot columns of ore are leached in series, with the effluent from each column passing directly to the succeeding column, then as the concentration of potassium chloride in the effluent from the last column begins to drop, the first column in the series may be taken offstream and a new fifth column introduced into position four in the series, while the feed brine is now introduced into the former column two. The contents of column 1 will be found to have been leached after proper displacement of residual brine at approximately the designed 80% extraction.

The leaching progress may be conveniently monitored by determining the composition of the brine effluent from the last column in the series, and when a drift below the saturation level is imminent or is just occurring, the leaching columns then may be advanced in the series as previously described. It is possible as a safety factor which will insure continuous production of substantially saturated brine and which will tend to smooth out minor variations in the brine concentration levels to operate with an extra column or columns in the series while the effluent of the next to last column is monitored for saturated brine production. Thus in this embodiment of the invention, the expression $1+1/Q$ determines the number of columns, and the total path length now becomes $1+Q$ times the original path length. This insures a more smoothly working continuous operation for the production of only saturated brine. As an example, if a 40 ft. depth of ore is leached at a Q of 0.25, normally 4 ten foot columns would be employed. But in this embodiment, 5 ten foot columns would be used. Operation with a lesser number of columns in series than is called for by the Q reciprocal, and removal of the first column in the series at the time the last column is put on stream results in an average extraction which is less than that desired, e.g., at least 80% at a Q of at least 0.2. This may be overcome to some extent by holding the first column on stream for a predetermined additional period of time, but usually this method of operation has disadvantages and it is preferred to operate with the number of columns as defined by the Q reciprocal or by the $1+1/Q$ relationship.

Through utilization of the saturation yield quotient Q, which is the ratio of substantially saturated brine to total brine throughput necessary for achieving at least an 80% by weight extraction of the soluble potassium salt content of the potash ore, the depth of ore needed to achieve a Q of at least 0.2 and the Q reciprocal or $1+1/Q$ relationship for determining the minimum number of columns to be placed in series, it is possible to leach potash ore contaminated by significant quantities of clays and other sliming materials crushed so that at least 10% by weight and preferably more is in the size range plus 3 mesh (Tyler) to 3–4 inches under conditions which give high percolation rates such as 25, 30, 35, 40 or higher gallons per square foot per hour, high extraction efficiencies, and continuous production of saturated to nearly saturated substantially clear brine.

A wide range of ore size is useful in practicing the invention. For instance, satisfactory ore sizes are, by weight, at least 10% and preferably 30 to 50% in the size range of plus 3 mesh to 3–4 inches and not more than 60%, and preferably not more than 40%, in the size range of less than 14 mesh. Also, potash ore often may be effectively leached in accordance with the invention in the size range as produced by a mechanical continuous miner. Thus, important economies may be effected as the ore need not be crushed or at most needs minimal crushing and the as mined ore may be passed directly to leaching vats and leached as an unclassified bed. Potash ores of the Carlsbad type may be referred to in the claims as being Carlsbad ore, although it is understood that the ore need not necessarily come from the Carlsbad region of New Mexico.

The solvent liquid used in the leaching of the ore, the temperature of the solvent liquid, and the temperature of the ore may be in accordance with prior art practice. However, a very satisfactory solvent for leaching Carlsbad-type potash ores is an aqueous solution saturated with sodium and potassium chloride at the existing ambient temperature such as, for example, 20–25° C., and then heated to an elevated temperature such as, for example, 80° C., 85° C., 90° C., 95° C., or to about the boiling point. The ore may be heated to an elevated temperature such as 80° C., 90° C., 95° C., 100° C., 105° C. or 110° C. by means of a suitable heating fluid such as steam before or during the leaching operation. Further processing of the hot product brine to produce a commercial potash, such as by cooling in a crystallizer, likewise may be in accordance with prior art practice.

The maximum depth of fine ore when leaching in accordance with prior art practice is about eight feet of total length or less. For example, leaching of a 7½ ft.

bed of −4 mesh ore with a single low temperature brine heated to 90–95° C. is borderline insofar as ability to achieve steady brine production is concerned. When partly saturated brines from a previous leach or advancing brines from a series leach are fed to leach an ore, the leach time is prolonged considerably over that involved in the leaching with a straight "low temperature brine" heated to 90°–95° C. Under these prolonged conditions, the fine ore decrepitates and tends to seal off the bed, the effect being more pronounced in deeper beds. Accordingly, about eight feet of total depth, whether all in one eight foot vat or in a series of a number of smaller vats, totaling eight feet, is the upper limit for fine ore leaching. A preferred lower limit for the leaching of coarse ore in accordance with the invention is about ten feet minimum, either in one ten foot vat, two five foot vats, or three 3.3 ft. vats, or a larger number of vats in series; but this would be true only for an ore having the minimum amount of coarse material. The coarser the material, the deeper the vat necessary to retain a Q of 0.2.

The instantaneous flow rates obtained when practicing the present invention are substantially higher than those obtained when leaching fine ore. For instance, instantaneous flow rates of at least 2 gal./ft.$^2$/hr./ft. of ore charged, and preferably 3 to 5 gals./ft.$^2$/hr./ft. of ore charged, are possible when practicing the invention and this is well above the instantaneous flow rates obtainable with fine ore. The Q value for a given system will increase as the flow rate decreases due to longer contact time. Thus the Q value reflects variables of the system such as flow rate, coarseness of ore, and bed depth.

The foregoing detailed description and the following specific examples are for purposes of illustration only and are not to be taken as limiting to the spirit or scope of the appended claims.

EXAMPLE I

The ore in this and Example II below was a potash ore from the Carlsbad region of New Mexico, assaying by weight approximately 20.7% potassium chloride, 5% insolubles such as clays and hematite and the remainder substantially halite.

About 2930 pounds of the above described ore was crushed to pass a half inch screen (for screen analysis, see Table I below) and was charged to a height of 17 feet in a twenty inch diameter insulated steel leaching column. The ore was supported on a flanged perforated plate which was secured by bolts to the column. The plate was covered with a double thickness of toweling which served as a coarse filter medium. Superheated steam under low pressure was admitted into the column below the perforated plate and forced upward through the bed of ore for the purpose of heating it to a temperature of about 105° C. Then the heated ore was leached with a brine saturated with respect to KCl—NaCl at low temperature (25° C.) but heated to about 95° C. As the leaching progressed, samples of the effluent brine were collected at frequent intervals for analysis for KCl. The flow rate was restricted to 52.5 gallons of brine per square foot per hour by means of a valve through which the effluent brine passed and leaching was continued to a total extraction of 97%. The results are given in Table II.

*Table I*

SCREEN ANALYSIS OF ORE FOR EXAMPLE I

| Tyler mesh: | Cumulative, percent retained |
| --- | --- |
| 3 | 10.4 |
| 4 | 21.2 |
| 6 | 31.0 |
| 8 | 38.3 |
| 14 | 61.4 |
| 20 | 69.2 |
| 100 | 94.9 |

*Table II*

| Gals. Brine/Ton of Ore | Degree of Saturation (KCl) of Effluent Brine | Cumulative, percent Extracted |
| --- | --- | --- |
| 25 | 1.00 | 7.5 |
| 50 | 1.00 | 15 |
| 100 | 1.00 | 29 |
| 120 | 1.00 | 34 |
| 125 | 1.00 | 35 |
| 160 | 0.99 | 43 |
| 190 | 0.92 | 51 |
| 225 | 0.79 | 58 |
| 300 | 0.48 | 70 |
| 400 | 0.24 | 78 |
| 428 | 0.19 | 80 |

Accordingly, at 80% extraction, 428 gallons of brine per ton of ore had been obtained of which 154 gallons/ton was substantially saturated with KCl. Thus the column was operated at $Q_{80}$ of 0.36. Cooling of the saturated hot effluent brine that was produced resulted in a pure potash product that was entirely satisfactory for sale as a commercial product without further processing.

EXAMPLE II

When the technique of Example I was applied to a 7½ foot by 1 foot diameter bed of similar ore (½"×0, 487 pounds), the brine being restricted to a flow rate of only 21 gallons per square foot per hour average, 86% of the potash in the charge was leached. From data obtained on cumulative percent leached, etc., as in Example I, it was determined that despite this slower flow rate (which would be expected to increase the Q of the system) a $Q_{80\%}$ of only approximately .06 was obtained, the yield of saturated brine being only 33 gallons per ton of ore charged. Thus the above leach was entirely unsatisfactory from the standpoint of achieving a Q of at least 0.2 or greater. The less than saturated brine, when cooled, produced a product too impure for sale as a commercial product without further processing.

As is evident then from Examples I and II, increasing the column height from about 7 to about 17 feet increased the operating Q of the system from about 0.06 to 0.36 at equal extraction levels.

EXAMPLE III

For examining the practicability of the prior art processes, leaching of a more finely ground ore was examined at about 8½ foot depth in the insulated column employed in Example I. This ore was also a Carlsbad potash ore and was crushed to give a product of screen analysis as follows.

| Tyler mesh: | Cumulative, percent retained |
| --- | --- |
| +4 | 0.5 |
| +6 | 7.1 |
| +8 | 21.6 |
| +10 | 40.8 |
| +14 | 58.6 |
| +20 | 74.8 |
| +28 | 85.9 |
| +35 | 92.9 |
| +48 | 96.4 |
| +65 | 98.2 |
| +100 | 99.0 |

The leaching techniques of the previous examples were applied as regards preheating with steam, use of a brine saturated with KCl—NaCl at 25° C., brine temperature, etc. However, though the flow rate of brine through the bed of ore was initially satisfactory (instantaneous flow rate of about 7 gal./ft.$^2$/hr./ft. depth), it rapidly attenuated so that in a short while it was below 2 gal./ft.$^2$/hr./ft. of depth and eventually, after only 55% of the potash had been leached, brine was percolating at only about 2 gallons per square foot per hour (instantaneous flow of about 0.25 gal./ft.$^2$/hr./ft. of depth). The leaching time was so prolonged as to be impractical, and the test was abandoned at this point.

EXAMPLE IV

This example and the succeeding one examined the leaching of Carlsbad potash ore having a similar composition to those of the preceding examples and crushed to pass a 1¼ inch screen. The ore had the following screen analysis.

| Tyler mesh: | Cumulative, percent retained |
|---|---|
| +.525 inch | 11.4 |
| +.371 inch | 22.9 |
| +3 mesh | 32.9 |
| +4 mesh | 41.2 |
| +6 mesh | 49.5 |
| +8 mesh | 57.9 |
| +10 mesh | 65.6 |
| +14 mesh | 72.2 |
| +20 mesh | 79.2 |
| +28 mesh | 84.5 |
| +35 mesh | 92.6 |
| +48 mesh | 95.2 |
| +65 mesh | 97.2 |

Four hundred and eighty five pounds of the ore crushed as indicated was charged to a depth of 7½ feet in the one foot diameter column of Example II, heated and leached as in the preceding examples with a low temperature (25° C.) KCl—NaCl brine heated to about 95° C. at a brine flow rate of 19 gallons per square foot per hour. From an analysis of the effluent brines, Q for 80% leaching was determined to be approximately .05, this low value being obtained because only some 40 gallons of saturated brine per ton of ore charged was obtained.

EXAMPLE V

About 3001 pounds of ore such as was employed in Example IV was charged to the twenty inch diameter column of Example I to a depth of 17 feet, steamed and leached as in the preceding examples, but at a brine flow rate which reached a maximum of 175 gallons per square foot per hour. After an hour of operation at this flow rate, the brine flow was artificially restricted to some 60 gallons per square foot per hour. From cumulative analysis of the effluent brines, Q at 80% extraction was determined to be 0.28, in contrast with $Q_{80\%}$ of .05 for identical ore leached at 7½ foot depth.

A summary of the results of all the examples is given in Table III.

*Table III*

SUMMARY OF EXAMPLES I, II, III, IV, V

| Example | Ore Size (Nominal) | Depth, feet | Flow Rate (gal./ft.²/hr.) | | | Instantaneous Flow Rate, gal./ft.²/hr./ft. of depth | |
|---|---|---|---|---|---|---|---|
| | | | Max. | Min. | $Q_{80\%}$ | Max. | Min. |
| I | -½″ x 0 | 17 | ¹ 52.5 | ¹ 52.5 | 0.36 | 3.1 | 3.1 |
| II | -½″ x 0 | 7½ | ¹ 21 | ¹ 21 | 0.06 | 2.8 | 2.8 |
| III | -4 mesh | 8½ | 60 | 2 | | 7 | 0.23 |
| IV | -1¼″ x 0 | 7½ | ¹ 19 | ¹ 19 | 0.05 | 2.5 | 2.5 |
| V | -1¼″ x 0 | 17 | 175 | ¹ 60 | 0.28 | 10 | 3.4 |

¹ Restricted flow operation.

What is claimed is:

1. In a process for leaching ores amenable to percolation leaching and containing a desired solvent soluble constituent wherein the ore is leached with a solvent liquid to produce an effluent containing the desired constituent, the improvement comprising percolation leaching a plurality of bodies of coarse ore to produce an effluent at least substantially saturated with the desired solvent soluble constituent, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the total path of the solvent liquid upon passing through the plurality of bodies of ore being of a length to provide a value for Q of at least 0.2, where Q is the ratio by volume of effluent at least substantially saturated with the desired constituent to the total volume of solvent liquid required for achieving not less than 80% by weight extraction of the desired constituent, the number of bodies of ore being not less than the numerical value for the reciprocal of Q, monitoring the content of the desired constituent in the effluent from an ore body in the series, and taking the first ore body in the series offstream and placing a fresh ore body onstream not substantially later than the time at which the effluent from the last ore body in the series would deviate substantially from saturation as indicated by the concentration of the desired constituent in the monitored effluent.

2. In a process for leaching ores amenable to percolation leaching and containing a desired solvent soluble constituent wherein the ore is leached with a solvent liquid to produce an effluent containing the desired constituent, the improvement comprising percolation leaching a plurality of bodies of coarse ore to produce an effluent at least substantially saturated with the desired solvent soluble constituent, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the path of the solvent liquid through the plurality of bodies of ore having a length to provide a value for Q of at least 0.2, where Q is the ratio by volume of effluent at least substantially saturated with the desired constituent to the total volume of solvent liquid required for achieving not less than 80% by weight extraction of the desired constituent, the number of bodies of ore being not less than the numerical value of $1+1/Q$, monitoring the content of the desired constituent in the effluent from an ore body in the series, and taking the first ore body in the series offstream and placing a fresh ore body onstream not substantially later than the time at which the effluent from the ore body immediately preceding the last ore body in the series would deviate substantially from saturation as indicated by the concentration of the desired constituent in the monitored effluent.

3. In a process for leaching ores amenable to percolation leaching and containing a soluble potassium salt wherein the ore is leached with a solvent liquid to produce an effluent containing the potassium salt, the improvement comprising percolation leaching a plurality of bodies of coarse ore to produce an effluent at least substantially saturated with the desired potassium salt, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the total path of the solvent liquid upon passing through the plurality of bodies of ore being of a length to provide a value for Q of at least 0.2, where Q is the ratio by volume of effluent at least substantially saturated with the potassium salt to the total volume of solvent liquid required for achieving not less than 80% by weight extraction of the potassium salt, the number of bodies of ore being not less than the numerical value for the reciprocal of Q, monitoring the content of the potassium salt in the effluent from an ore body in the series, and taking the first ore body in the series offstream and placing a fresh ore body onstream not substantially later than the time at which the effluent from the last ore body in the series would deviate substantially from saturation as indicated by the concentration of the potassium salt in the monitored effluent.

4. In a process for leaching ores amenable to percolation leaching and containing a soluble potassium salt wherein the ore is leached with a solvent liquid to produce an effluent containing the potassium salt, the improvement comprising percolation leaching a plurality of bodies of coarse ore to produce an effluent at least substantially saturated with the potassium salt, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the total path of the solvent liquid upon passing through the plurality of bodies of ore being of a length to provide a value for Q of at least 0.2, where Q is the ratio by volume of effluent at least substantially saturated with the potassium salt to the total volume of solvent liquid required for achieving not less than 80% by weight extraction of the potassium salt, the number of bodies of ore being not less than the numerical value of 1+1/Q, monitoring the content of the potassium salt in the effluent from an ore body in the series, and taking the first ore body in the series offstream and placing a fresh ore body onstream not substantially later than the time at which the effluent from the ore body immediately preceding the last ore body in the series would deviate substantially from saturation as indictaed by the concentration of the potassium salt in the monitored effluent.

5. The process of claim 4 wherein the length of the path of the solvent passing through the plurality of bodies of ore is at least 1+Q times the minimum path length.

6. In a process for leaching Carlsbad potash ore wherein the ore is leached with a solvent liquid to produce an effluent containing potassium chloride, the improvement comprising percolation leaching a plurality of bodies of coarse ore to produce an effluent at least substantially saturated with potassium chloride, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the total path of the solvent liquid upon passing through the plurality of bodies of ore being of a length to provide a value for Q of at least 0.2, where Q is the ratio by volume of effluent at least substantially saturated with potassium chloride to the total volume of solvent liquid required for achieving not less than 80% by weight extraction of the potassium chloride, the number of bodies of ore being not less than the numerical value of 1+1/Q, monitoring the content of the potassium chloride in the effluent from an ore body in the series, and taking the first ore body in the series offstream and placing a fresh ore body onstream not substantially later than the time at which the effluent from the ore body immediately preceding the last ore body in the series would deviate substantially from saturation as indicated by the concentration of the potassium chloride in the monitored effluent.

7. The process of claim 6, wherein the length of the path of the solvent passing through the plurality of bodies of ore is at least 1+Q times the minimum path length.

8. A process for leaching ore comprising wet-preheating coarse ore containing potassium chloride, percolation leaching a plurality of bodies of the coarse wet-preheated ore with a liquid solvent for the potassium chloride to produce an effluent at least substantially saturated with potassium chloride, the ore having a particle size such that at least 10% by weight of the particles are in the size range of plus 3 Tyler mesh to 4 inches, the plurality of bodies of ore being arranged in series and the liquid solvent being passed through the first ore body in the series and then successively through subsequent bodies of ore in the series, the total path of the liquid solvent upon passing through the plurality of bodies of ore being of a length to provide a value for Q of at least 0.2, where Q is the ratio by volume of effluent liquid solvent at least substantially saturated with potassium chloride to the total volume of liquid solvent required for achieving not less than 80% by weight extraction of the extractable potassium chloride content of the ore, the number of bodies of ore being not less than the numerical value for the reciprocal of Q, and taking the first ore body in the series offstream and placing a fresh ore body onstream not substantially later than the time at which the effluent from the last ore body in the series deviates substantially from saturation with respect to potassium chloride.

9. The process of claim 8 wherein the ore is coarsely crushed, unclassified, Carlsbad potash ore.

10. The process of claim 8 wherein the ore is coarsely crushed, unclassified, Carlsbad potash ore, and the ore is wet-preheated with a heating medium including steam to an elevated temperature not exceeding about 110° C.

11. In a process for leaching ore containing a desired solvent soluble constituent with a solvent liquid, the ore being amenable to percolation leaching and a solvent liquid effluent being produced containing the desired constituent, the improvement comprising percolation leaching a plurality of bodies of coarse ore to produce an effluent at least substantially saturated with the desired solvent soluble constituent, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the total path of the solvent liquid upon passing through the plurality of bodies of ore being of a length to provide a value for Q of at least 0.2, where Q is the ratio by volume of effluent at least substantially saturated with the desired constituent to the total volume of solvent liquid required for achieving not less than 80% by weight extraction of the desired constituent, and taking a leached ore body in the series offstream and placing a fresh ore body onstream not substantially later than the time at which the effluent from the last ore body in the series deviates substantially from saturation with respect to the desired constituent.

12. In a process for leaching Carlsbad potash ore wherein the ore is leached with a solvent liquid to produce an effluent containing potassium chloride, the improvement comprising percolation leaching a plurality of bodies of coarse ore to produce an effluent at least substantially saturated with potassium chloride, the ore having a particle size such that at least 10% by weight of the particles are in the size range of plus 3 Tyler mesh to 4 inches, the plurality of bodies of ore being arranged in series and the solvent liquid being passed through the first ore body in the series and then successively through subsequent bodies of ore in the series, the total path of the solvent liquid upon passing through the plurality of bodies of ore being of a length to provide a value for Q of at least 0.2, where Q is the ratio by volume of effluent at least substantially saturated with potassium chloride to the total volume of solvent liquid required for achieving not less than 80% by weight extraction of the potassium chloride, and taking a leached ore body in the series offstream and placing a fresh ore body onstream not substantially later than the time at which the effluent from the last ore body in the series deviates substantially from saturation with respect to potassium chloride.

References Cited in the file of this patent

UNITED STATES PATENTS

| | | |
|---|---|---|
| 2,788,257 | Duke | Apr. 9, 1957 |
| 2,961,307 | Wilson | Nov. 22, 1960 |